United States Patent [19]

Hern et al.

[11] 4,108,483

[45] Aug. 22, 1978

[54] LATCHING DEVICE

[75] Inventors: John F. Hern, Southfield; Joseph L. Buccellato, Warren, both of Mich.

[73] Assignee: Massey-Ferguson Inc., Detroit, Mich.

[21] Appl. No.: 813,907

[22] Filed: Jul. 8, 1977

[51] Int. Cl.[2] .................................................. E05C 3/04
[52] U.S. Cl. .................................................. 292/272
[58] Field of Search ............... 292/246, 262, 268, 299, 292/270

[56] References Cited

U.S. PATENT DOCUMENTS

| 107,720 | 9/1870 | Pusey | 292/268 |
|---|---|---|---|
| 957,796 | 5/1910 | Parmeter | 292/246 X |
| 1,601,352 | 9/1926 | Dougherty | 292/246 |
| 1,873,643 | 8/1932 | Harbert | 292/269 |

FOREIGN PATENT DOCUMENTS 903,730  1/1945  France .................................. 292/129

Primary Examiner—Richard E. Moore
Attorney, Agent, or Firm—Thomas P. Lewandowski

[57] ABSTRACT

A latching arrangement for complemental top and bottom door panels on a cab of a tractor includes a handle which is pivotally mounted to the top door panel between operative and inoperative positions. Biasing means in the form of a coil spring mounted between the handle member and the door normally urges the member to its inoperative position. An element connected to the lower door panel and defining a recess to receive the handle member operates to position the upper door in angular relationship to the complemental lower door member to ventilate the cab. A peripheral portion of the handle which is received in the connecting element is disposed at an angle relative to the axis about which the handle pivots to thereby define the angle at which the complemental door panels are held apart.

7 Claims, 5 Drawing Figures

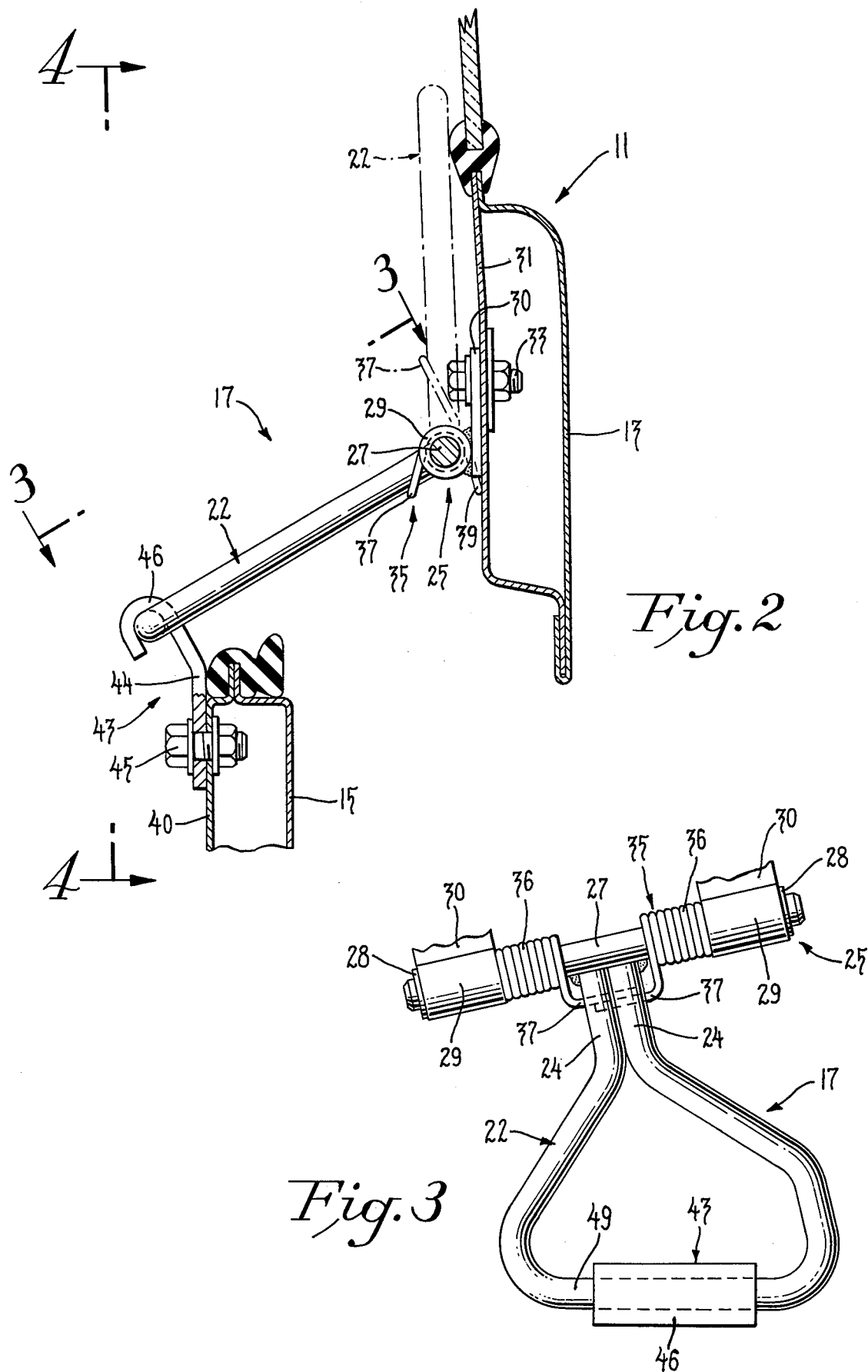

LATCHING DEVICE

This invention relates to improved latching apparatus and more particularly to latching apparatus adapted to be employed to hold complemental door panels in angular relationship with one another on cabs of industrial type tractors.

One type of latching device which has been previously used for such purpose utilizes a pair of link elements pivoted respectively at one of their ends to a corresponding upper and lower door panel and connected at their inner ends to one another by means of a clamping-nut arrangement. The degree of opening between the door panel portions is dictated by the angular relationship at which the respective links are clamped together one with respect to the other. A disadvantage of such clamping link arrangements, has been that due to vibration the clamping link members become loose relative to the door panels and often rattle to a closed position. A further disadvantage has been that the extent of opening between the two door panels has been limited by the length of the links and their rotation relative to the axis about which the door panels are rotated. Often such link arrangements have prevented the operator from opening the window section of the door to its fully open condition.

It is an object of this invention, therefore, to provide an improved latching device which avoids one or more of the disadvantages of the prior art arrangements and which has improved utility.

It is a further object of this invention to provide an improved latching apparatus to secure two complemental door panels in spaced angular relationship irrespective of the vibrational stresses applied to the tractor during operating conditions.

In accordance with the invention, the improved latching apparatus of the present invention is operable to maintain first and second complemental door panels in angular spaced apart relationship, and comprise means that include a latching member. Means for pivotally mounting the member to the first door panel are also provided thereby enabling movement of the latching member between operative and inoperative positions. Biasing means connected to the latching member and said first door panel normally urge the member into its inoperative position. Means secured to the second complemental door panel engage the latching member in its extended operative position, with said biasing means serving to secure said latching member in locked operative engagement.

For a better understanding of the present invention, together with other and further objects thereof, reference is had to the following description taken in connection with the accompanying drawing and its scope will be pointed out in the appended claims.

In the drawing FIG. 1 is a perspective view of a cab of a tractor having complemental side door panels embodying the latching apparatus of the present invention.

FIG. 2 is a sectional view taken through upper and lower complemental door panels of the cab along the lines 2—2 of FIG. 1;

FIG. 3 is a view taken along the lines 3—3 of FIG. 2 showing the external configuration of the latching member in plan.

Figure 1:
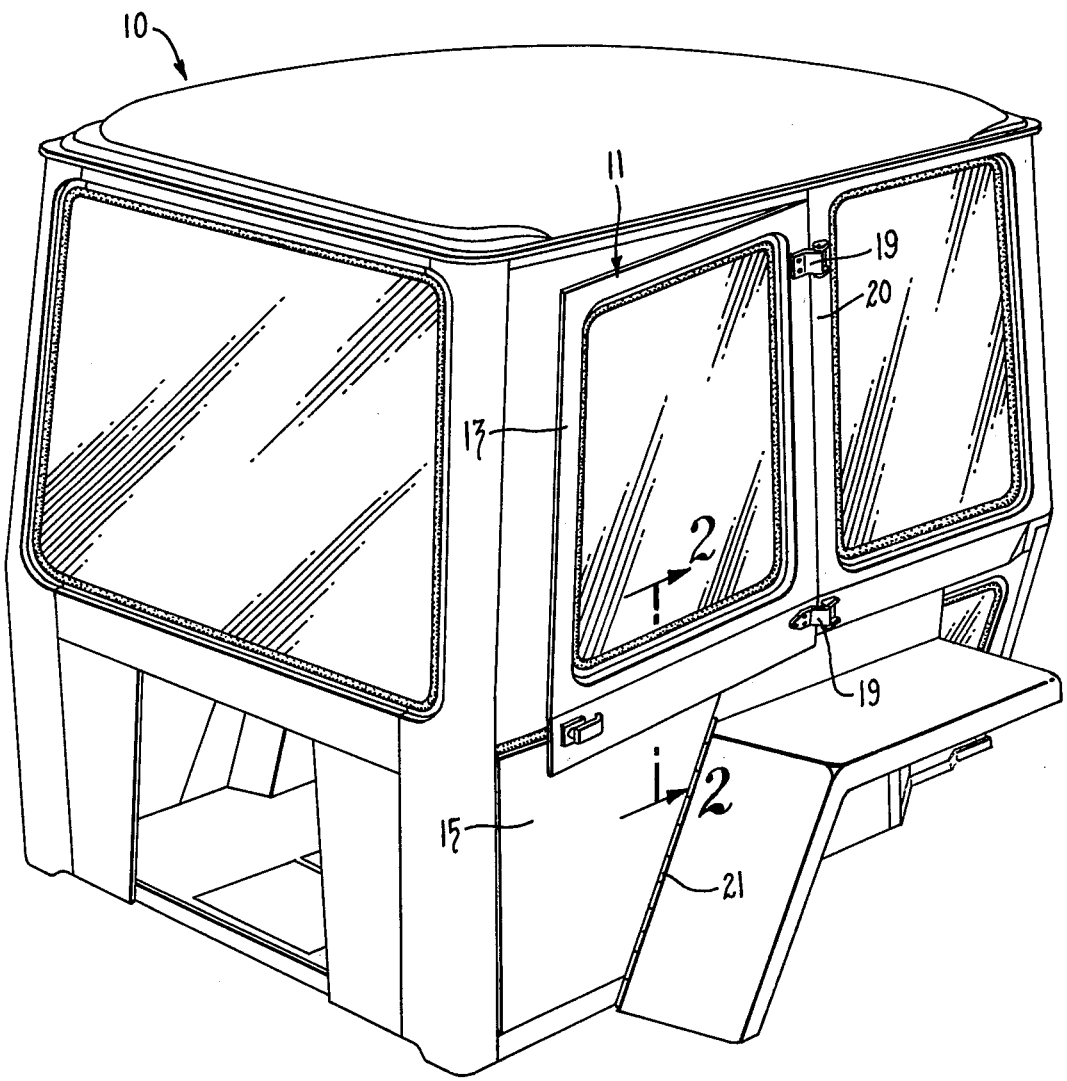

Referring to FIG. 1 of the drawing, there is shown a cab 10, having a side door 11 comprising upper and lower complemental door panels 13, 15 respectively. For ventilation purposes latching apparatus 17, see FIG. 2 and 3, is provided to maintain the complemental door panels ajar. The upper door 13 is suitably hinged as at 19 to frame 20 while the lower complemental door panel is hinged as at 21 to the lower frame portion of the cab. The structural configuration of upper and lower door panels 13, 15 form no part of the present invention.

Figure 4:
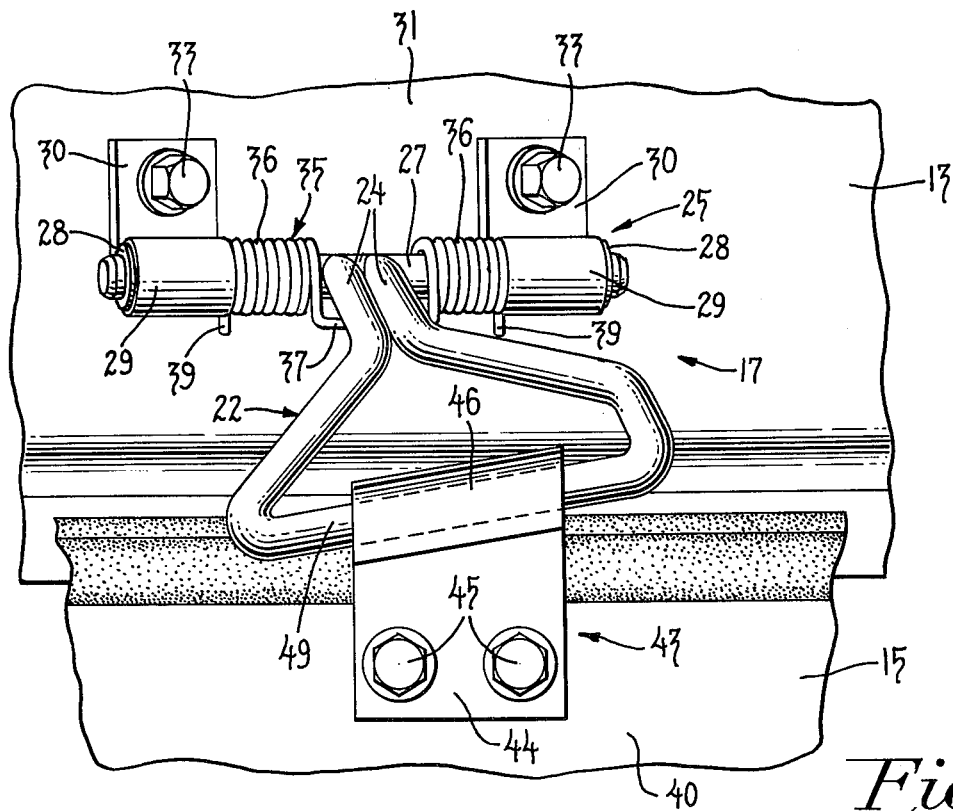
FIG. 4 is a side elevational view of the latching apparatus taken along the lines 4—4 of FIG. 2 illustrating the same in its operative position and extending between the angularly disposed upper and lower complemental door panels of the cab to enable ventilation of the cab.

With further reference to FIGS. 2-4 inclusive the latching apparatus 17 comprises a handle member 22 in the form of a rod bent so that its ends 24 are brought together in a manner so that the rod is configured to form a closed loop. Pivot means 25 are provided to mount the handle for pivotal movement relative to the panel 13 which include a cross rod 27 which may be suitably secured to rod ends 24 as by welding. The opposite outside ends of the cross rod 27 are each received within a pivot socket 29. Each socket in turn includes a tab 30 enabling the socket to be secured to the inside surface 31 of door 13 as by bolts 33.

Referring to FIG. 2 the handle member 22 is normally urged rotatably about the axis of cross bar 27 from its operative full line position to its retracted inoperative position indicated in phantom lines. For this purpose biasing means 35 are provided, which include, in the present instance, a pair of coil springs 36 encircling cross bar 27 and interposed between ends 24 of member 22 and oppositely disposed pivot sockets 29. Snap washers 28 suitably affixed to opposite ends of cross bar 27 preclude axial movement of the bar 27 relative to pivot sockets 29. Each spring 36 includes one end 37 which suitably coacts with the ends 24 of the handle and an opposite end 39 which reacts against inner face 31 of panel assembly 13. The convolutions of the coil spring 36 are applied around the periphery of cross bar 27 in such a manner that upon handle 22 being moved from its folded or inoperative position to its operative full line position said springs are stressed an increased amount. In order to bridgingly connect the handle 22 to the lower complemental door panel 15, connecting means 15, connecting means 43 including a member 44 is suitably secured to surface 40 of panel 15 by means of bolt 45. The upper end of the member is configured to define a recess and is of inverted U-shape form in which its free end 46 is spaced inboard of the inner face 40 of the lower panel assembly 15.

With reference now to FIG. 3 it is noted that handle member 22 includes a straight portion 49 which is remote from cross bar 27 and the axis of said straight portion is inclined with respect to the axis of cross bar 27 and defines the angle at which the upper door panel 13 is held apart from the lower door panel 15. It is noted that when the upper door panel 13 is so held ajar from lower door panel 15, the spring means 35 are stressed a maximum amount compared with the stress in the springs when the handle is in its phantom line position corresponding to its inoperative position. Thus during any bouncing of the tractor and cab the spring means 35 are most effective to prevent disassembly of the handle from the connecting means 43 of the lower door. Conversely when the handle 22 is in its up position the spring loading on the handle is at a minimum. With the handle in such latter position the upper door panel 13 may be pivotally moved to its fully open position or moved in an opposite direction and locked so that the upper and lower complemental door panels form a unitary door.

Figure 5:
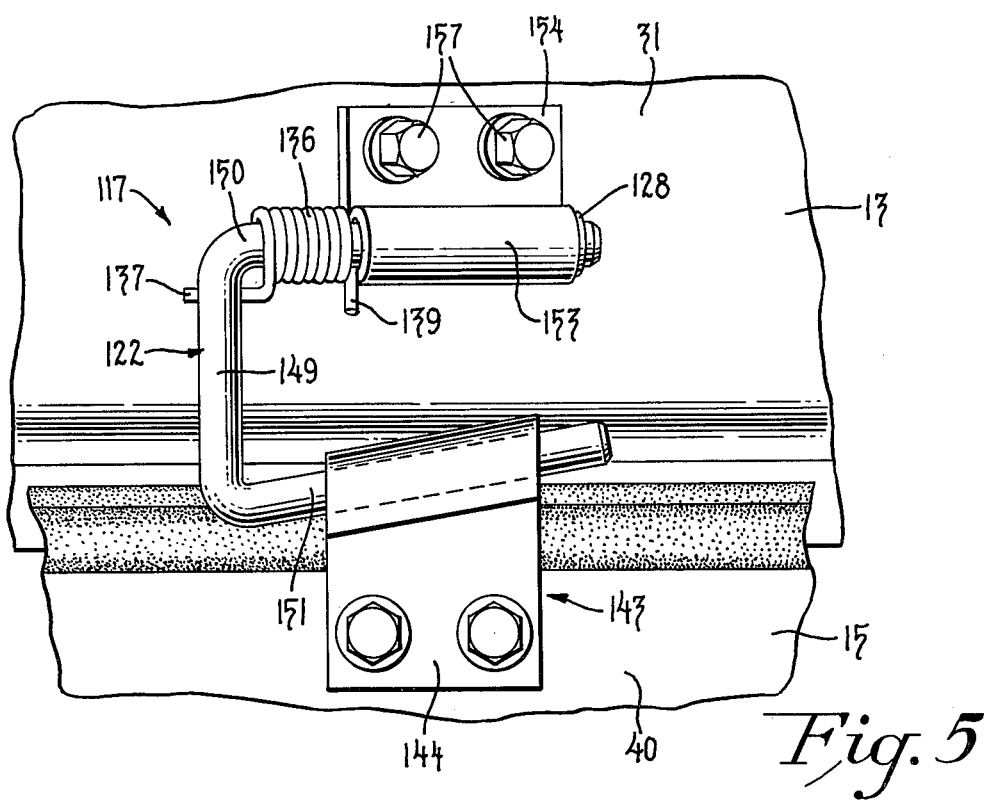
FIG. 5 is a view similar to that shown in FIG. 4 and illustrates a modified form of latching arrangement.

Referring now to FIG. 5 there is shown a modified form of the invention. The latching apparatus 117 comprises a generally U-shaped handle 122 having a base portion 149 and first and second arms 150 and 151, respectively. The first arm 150 constitutes a shaft portion received in a pivot sleeve or socket element 153 which includes a tab portion 154 enabling the same to be secured to the inner face 31 of the upper complemental door member 13 by means of a pair of bolts 157. Biasing means in the form of a coil spring 136 encircles the arm 150 adjacent the base 149 of the U-shaped handle and includes an extremity 137 which reacts with said base portion 149. The opposite end 139 of the spring engages and reacts against the inner face 31 of the upper panel 13. The first named arm 150 of handle 122 projects through the pivot socket 153 to enable a snap washer 128 to be secured on its end to prevent axial shift of the pivot arm. The axis of the opposite arm 151 of the handle is slightly skewed with respect to the axis of arm 150. The divergence between arms 150, 151, and the length of connecting base 149 define the angle at which the two door panels 13, 15 are held apart. As seen in FIG. 5, the arm 122 is shown in its operative position in engagement with connecting means 143 attached to the inside face 40 of lower door panel member 15. By this means the upper complemental door panel 13 is by virtue of connecting means 143 positioned and maintained in an ajar position corresponding to a ventilating position of said upper panel. The spring biasing means 136 moreover locks the U-shaped handle 122 into its operative position to thereby maintain the upper door in its ventilating position irrespective of the jolts and vibration to which the tractor cab may be subjected. When the operator of the tractor disengages the handle 122 from connecting member 144 the spring 136 biases the handle to it inoperative position corresponding to the position of handle 122 in FIG. 2, illustrated in its phantom line position.

From the foregoing it is seen that an improved latching device has been provided that is simple, reliable, and low in cost to fabricate.

What is claimed is:

1. In a latching arrangement for a first door panel and second complemental panel comprising, means for holding said first and second panels at an angle to one another including a handle member, means pivotally mounting said member to said first panel between inoperative and operative positions, means connected to said member and said first panel for normally biasing said member into its inoperative position, and means connected to said second panel to engage said member in its operative position, said member including a peripheral portion opposite said pivotal mounting means and wherein the axis of said peripheral portion is inclined relative to the pivotal axis of said pivotal mounting means of said member, whereby said biasing means urges said member into engagement with said connecting means and said peripheral portion inclination militates against disengagement of said member and said connecting means to maintain them in locking engagement.

2. In the latching arrangement as set forth in claim 1, wherein said member defines a loop for engagement by an operator.

3. In the latching arrangement as set forth in claim 2 wherein said means pivotally mounting said member include a shaft portion contiguous with said member.

4. In the latching arrangement as set forth in claim 3 wherein said biasing means include coil spring means encircling said shaft portion, said coil spring means having one end reacting against said first door panel and another portion thereof coacting with said loop member to urge the same to its inoperative position.

5. In the latching arrangement as set forth in claim 1 wherein said means connected to said second door panel includes a member having an inverted U-shaped portion defining a recess to receive said peripheral portion, the latter being normally retained therein under the action of said coil spring means.

6. In the latching apparatus as set forth in claim 5 wherein said inverted U-shaped portions includes a pair of downwardly extending legs, one longer than the other, said longer leg being secured to the second door panel and the other leg extending in a direction away from said loop member.

7. In the latching arrangement as set forth in claim 1 wherein said member is of generally U-shaped configuration and wherein one of said arms of said U cooperates with said pivotal mounting means and wherein said other arm thereof cooperates with said connecting means of said second door panel.

* * * * *